United States Patent [19]

Fukushima et al.

[11] Patent Number: 4,721,143
[45] Date of Patent: Jan. 26, 1988

[54] PNEUMATIC TIRE WITH EXCELLENT RIDE FEELING

[75] Inventors: Hironobu Fukushima, Kodaira; Masahiro Takayama, Musashino, both of Japan

[73] Assignee: Bridgestone Corporation, Tokyo, Japan

[21] Appl. No.: 816,582

[22] Filed: Jan. 6, 1986

[30] Foreign Application Priority Data

Jan. 11, 1985 [JP] Japan ................. 60-2895

[51] Int. Cl.$^4$ ............................................. B60C 3/00
[52] U.S. Cl. ..................................... 152/454; 152/535
[58] Field of Search ........... 152/454, 526, 538, 209 R, 152/535

[56] References Cited

U.S. PATENT DOCUMENTS

| | | | |
|---|---|---|---|
| 3,244,213 | 4/1966 | McMannis | 152/454 |
| 4,037,637 | 7/1977 | Arimura et al. | 152/454 |
| 4,082,132 | 4/1978 | Arai et al. | 152/454 X |
| 4,155,392 | 5/1979 | Duderstadt et al. | 152/454 X |
| 4,328,850 | 5/1982 | Uemura et al. | 152/454 |
| 4,343,341 | 8/1982 | Jackson | 152/534 |
| 4,345,634 | 8/1982 | Giron | 152/454 |
| 4,387,758 | 6/1983 | Matsuda et al. | 152/454 |
| 4,418,735 | 12/1983 | Musy | 152/200 |
| 4,445,560 | 5/1984 | Musy | 152/200 |

*Primary Examiner*—Jerome Massie
*Assistant Examiner*—Ramon R. Hoch
*Attorney, Agent, or Firm*—Sughrue, Mion, Zinn, Macpeak & Seas

[57] ABSTRACT

A passenger car pneumatic tire excellent in ride feeling, wherein a tread is reinforced by a belt consisting of plural metal cord layers so piled that the cords are intersected with one another and the following relation is met:

$$-1.5 \leq [(S/So)-1] \times 100 \leq -0.1$$

in which S is the maximum tire width in the state that the tire is fitted to a normal rim while being filled with air at a pressure of 1.7 kg/cm$^2$ and So is the tire maximum width after being mounted onto a rim but prior to the air pressure being applied to the tire.

3 Claims, 11 Drawing Figures

FIG_7
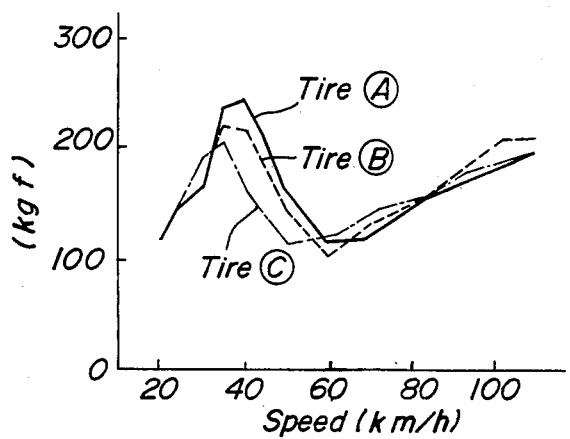
FIG_8a
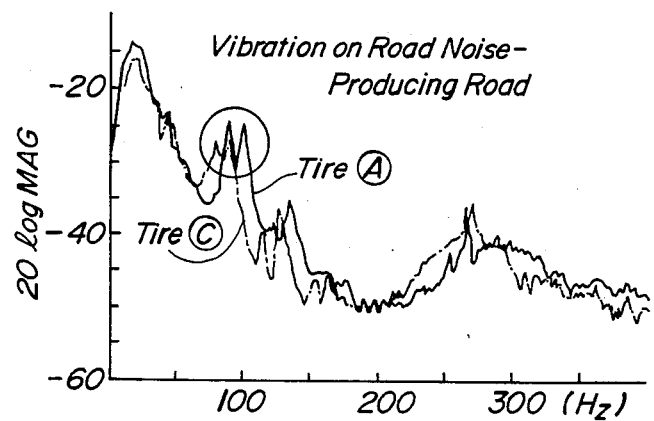
FIG_8b
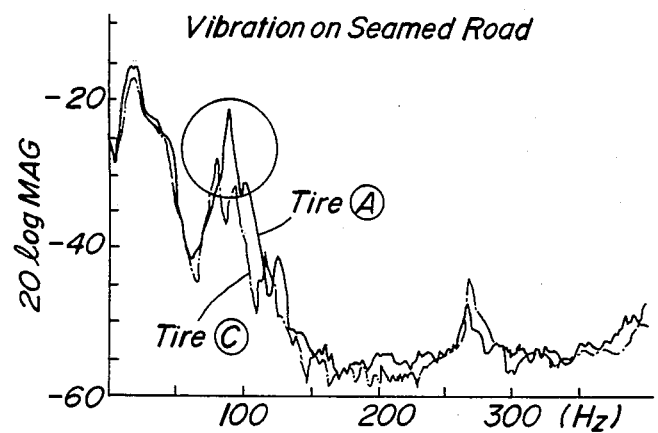

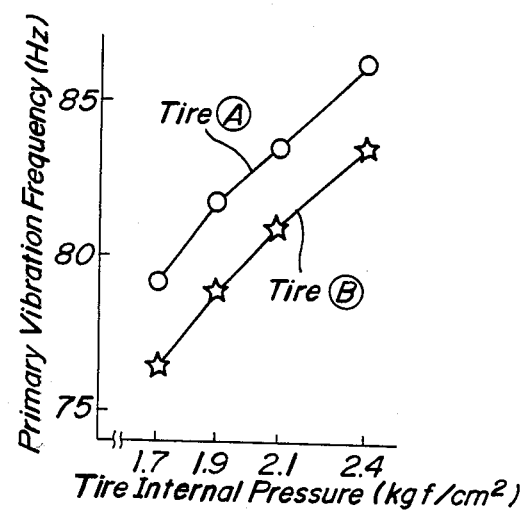
FIG_6

PNEUMATIC TIRE WITH EXCELLENT RIDE FEELING

BACKGROUND OF THE INVENTION

1. Field of the Invention

The present invention relates to a pneumatic tire with an excellent ride feeling in which harshness and road noise problems are effectively and appropriately solved.

2. Related Art Statement

In order to improve the ride feeling against vibrations of the pneumatic radial tires for use in passenger cars, it is necessary to take countermeasures against the so-called harshness ordinarily peculiar in the case of the vibration frequently of not more than 100 Hz at a speed of 20–60 km and vehicle inside noises at around 80 to 300 Hz produced in running on irregularly uneven roads such as roughly paved roads at a vehicle speed of 30 to 80 km/h, that is, the so-called road noises.

Although passenger car pneumatic tires have a tread which is reinforced by a belt composed of metal cord layers piled so that the cords are intersected with one another to have a smaller rolling resistance and more excellent cornering stability as compared with the tires using textile cords in the belt, it is known that the former type of tires do not necessarily give satisfactory ride feeling.

To the contrary, the harshness including vertical and forward and rearward axial movement forces when the tire rides over projections on a road is reduced by using organic cord layer or a cap belt layer in combination with the metal cord belt layers and restraining enveloping at the tread. Thereby, vibrations of not more than 100 Hz are reduced particularly in a vehicle speed range from 20 to 60 km/h. With respect to the road noises at frequency range of not less than 100 Hz, this countermeasure can afford some effect.

However, while the rigidity against bending outside of the belt plane is increased by reinforcing the belt with such an organic cord layer or cap belt layer, there are disadvantages that the tire weight increases and in addition the rolling resistance is extremely deteriorated.

SUMMARY OF THE INVENTION

An object of the present invention is to advantageously realize improvement on the ride feeling performance against vibrations of a passenger car pneumatic radial tire by reducing harshness and road noises while also aiming at the improvement in tire designing with respect to the reduction in tire weight and rolling resistance.

According to the present invention, there is a provision of a passenger car pneumatic tire excellent in ride feeling, wherein a tread is reinforced by a belt consisting of plural metal cord layers so piled that the cords are intersected with one another and the following relation is met:

$$-1.5 \leq [(S/So) - 1] \times 100 \leq -0.1$$

in which S is the tire maximum width in the state that the tire is fitted to a normal rim while being filled with air at a pressure of 1.7 kg/cm², and So is the tire maximum width after being mounted into a rim but prior to the air pressure being applied to the tire.

These and other objects, features, and advantages of the present invention will be well appreciated upon reading of the following description of the invention when taken in conjunction with the attached drawings with understanding that some modifications, variations and changes of the same could be easily done by the skilled in the art to which the invention pertains without departing from the spirit of the invention or the scope of the claims appended hereto.

BRIEF DESCRIPTION OF THE DRAWINGS

In order to facilitate the understanding of the invention, reference is made to the attached drawings, wherein:

FIG. 6 is a diagram showing the relation among the tire internal pressure, the primary vibration frequency and the preshape amount;

FIG. 7 is a diagram showing the relation among the vehicle speed, the p-p value and the preshape amount; and FIG. 8 shows diagrams comparing the vertical vibrations on a road noise-producing road and a harshness-producing seamed road.

DESCRIPTION OF THE PREFERRED EMBODIMENTS

Figure 1:
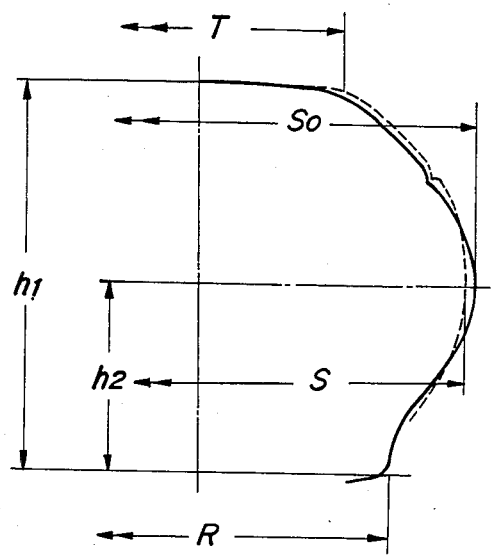
FIG. 1 is a schematic view of a tire outer contour representing the concept of the present invention.
Figure 2:
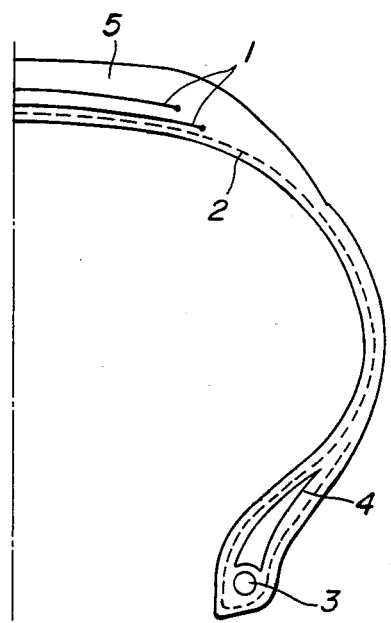
FIG. 2 is a sectional view of a tire according to the present invention.

FIG. 1 shows the sectional contour of a pneumatic tire according to the present invention, and FIG. 2 shows the sectional structure of FIG. 1.

In the figures, T, S and R show a tread width, the maximum tire width and a bead width, respectively. $h_1$ and $h_2$ show a tire height and the height at the maximum tire width, respectively. They all show the dimensions of the tire in the state that the tire is assembled onto a rim and filled with air of an internal pressure of 1.7 kg/cm². So shows the maximum tire width prior to the air pressure being applied to the tire. In FIG. 2, reference numerals 1, 2, 3, 4 and 5 show a belt composed of two metal cord layers, a carcass in which polyester cords are radially arranged, a bead core, a bead filler and a tread, respectively.

Figure 3:
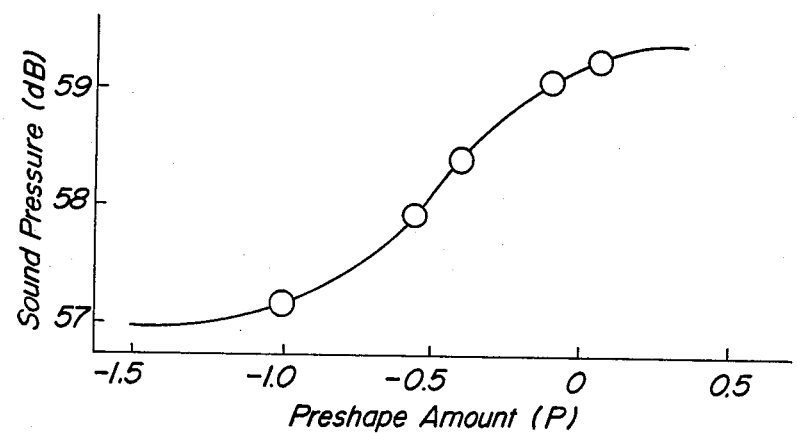
FIG. 3 is a diagram showing the influence of a preshape amount as a function of sound pressure.

It is important according to the present invention to set the preshape amount P defined by $P = [(S/So) - 1] \times 100(\%)$ within a range from $-1.5$ to $-0.1$. By so doing, the tensile strength of the belt can be appropriately enhanced, and that of the carcass can be advantageously relaxed, so that as FIG. 3 shows the influence of the preshape value P upon vehicle inside sound at a vehicle speed of 40 km/h, the vehicle inside sound can be effectively reduced when the preshape amount P given by the above inequality is fallen in the above range. If the preshape amount is smaller than $-1.5$, the tire shape becomes oval, so that uneven wear is likely to be produced.

The reduction in the harshness and the road noises are discussed in the following:

Harshness Reduction:

A vertically axial force to be applied upon a vehicle shaft of the vehicle is represented by a product $F_v \cdot H$ between a vertically inputted force $F_v$ at a tire ground contacting area and a vertical vibration transmission rate H. The harshness vibrations are closely related with the vertically axial force. Thus, harshness can be reduced by reducing either one or both of the inputted force $F_v$ and the transmission rate H.

In order to reduce the inputted force $F_v$ at the tire ground contacting area, it has been found that in a vehicle speed range from 20 to 60 km/h, a case where a tire treads over a road projection which is a cause of the inputted force without enclosing thereof is preferable to a case where the tread completely envelops the projection, that is, enveloping. Namely, more preferable results can be obtained by increasing the belt strength, which causes an increase in the rigidity against bending outwardly from the belt plane when the internal pressure is applied to the tire.

Figure 4:
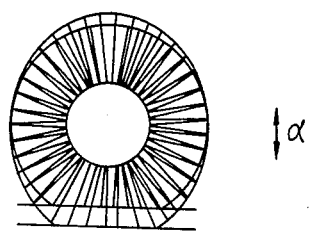
FIG. 4 is a schematic side view of a tire showing a primary vibration mode.

On the other hand, since the primary vibration having a vertically deviating motion of the tire shown by an arrow $\alpha$ in FIG. 4 as a deforming mode largely contributes to the vertical vibration transmission rate, the smaller the frequency of the primary vibration, the smaller is simultaneously the vertical vibration transmission rate H. Therefore, in order to lessen the vertical vibration transmission rate, relaxing of the carcass tensile force on the tire side portion is effective to reduce the frequency of the primary vibration.

Road Noise Reduction:

Road noises which present problem particularly in the range of the vibrations of not less than 100 Hz are closely related to the inputted forces Fp forward and rearward of the tire ground contacting area, and are also closely related with the vertically inputted force $F_v$ on the ground contacting surface. Therefore, the strengthening of the belt tensile force which increases the rigidity against the bending outwardly from the belt plane when the internal pressure is applied is effective in reducing the road noises.

That is, the strengthening of the belt tensile force serves to reduce the harshness and the road noises, while the relaxing of the carcass tensile strength serves to reduce the harshness.

It is particularly preferable that the ratio $h_2/h_1$ between the height $h_1$ of the tire section and the height $h_2$ at the maximum tire width is in a range from 0.45 to 0.55, the ratio T/S between the tread width T and the maximum tire width S is in a range from 0.60 to 0.65, and the rate R/S between the bead width R and the maximum tire width S in a range from 0.70 to 0.75.

Figure 5A:
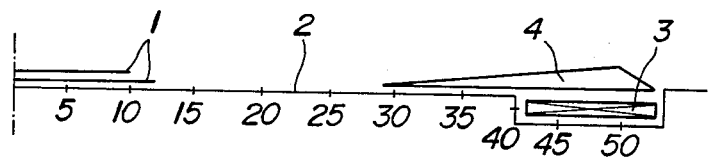
FIG. 5 shows distribution views of tensile force at carcass and tensile force at belt along a carcass line.
Figure 5B:
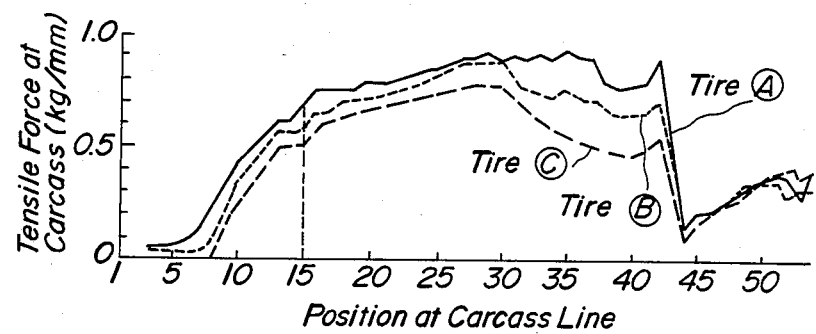
Figure 5C:
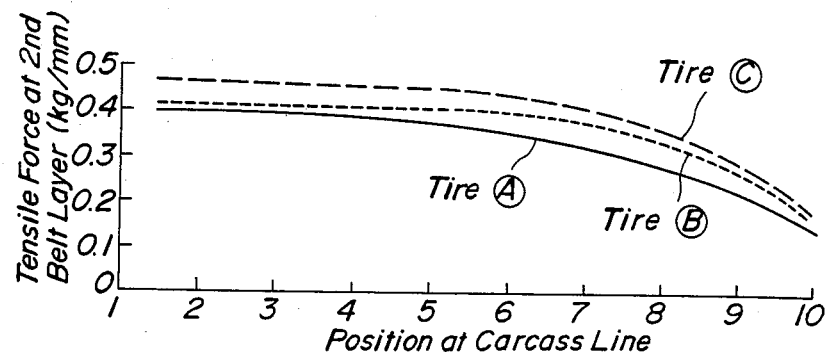

Four kinds of radial tires A, B, C and D having the sectional structure shown in FIG. 2 with the preshape amounts P, +0.06%, −0.4%, −0.6%, and −1.0%, respectively, were prepared in trial under the relation that $h_2/h_1$ was 0.48, T/S was 0.62 and R/S was 0.74 according to FIG. 1. With respect to these tires, the tire component arrangement was developed from the crown center to the bead portion along the abscissa in FIG. 5(a). The strength distribution of the carcass 2 and the distribution of tensile force produced in the outer layer (the second belt layer) of the belt 2 along the above development are compared in FIGS. 5(b) and 5(c), respectively.

It is evident from these figures that the tensile force at the carcass, particularly on the tire side portion, is more relaxed and the tensile force of the belt is more increased according to the tires (B) and (C) of the present invention as compared with the tire (A) (Comparative tire) having the preshape amount outside of the range of the present invention.

FIG. 6 compares the depending relation of the primary vibrations shown by $\alpha$ in FIG. 4 upon the internal air pressure with respect to the tire (B) with that in the tire (A). As evident from FIG. 6, the frequency of the primary vibration is reduced so that the primary vibration transmission rate is reduced to lower the harshness as mentioned before.

FIG. 7 compares the influences of the preshape amount upon variation in inputted p-p value to the vehicle shaft at the vehicle speed of 20 to 100 km/h in an enveloping vibration test on a room drum with respect to the tires (A), (B) and (C) by a solid line, a broken line and a dotted line, respectively. As shown in FIG. 7, the vertically inputted force $F_v$ on the ground contacting area is reduced by strengthening the tensile strength of the belt to effectively reduce the harshness.

Vehicle inside sounds were actually measured at a vehicle speed of 40 km/h for comparison with respect to the tire (C) of the present invention and the tire (A) as Comparative tire.

FIGS. 8(a) and 8(b) show measured results of the vertical vibrations on the road noise producing road and the vertical vibration on the seamed road. As shown in FIGS. 8(a) and 8(b), the tire (C) according to the present invention is more excellent in the ride feeling against the vibrations than the Comparative tire.

According to the present invention, the ride feeling against the vibrations can be effectively improved without causing any trouble or reducing the deteriorating the weight reduction and the rolling resistance in the case of the passenger car pneumatic tire.

What is claimed is:

1. A passenger car pneumatic tire giving excellent ride feeling, wherein a tread is reinforced by a belt consisting of plural metal cord layers piled so that the cores in one metal cord layer are intersected with those of a juxtaposed metal cord layer;

the following relations are met:

$$-1.5 \leq [(S/So)-1] \times 100 \leq -0.1$$

in which S is the maximum tire width in the state that the tire is fitted to a normal rim while being filled with air at an internal pressure of 1.7 kg/cm² and So is the tire maximum width after being mounted onto a rim but prior to the air pressure being applied to the tire;

$0.70 \leq R/S \leq 0.75$ in which R and S are a width between beads and the maximum tire width, respectively, of an inflated tire;

a center portion of the tread does not vary in a radial direction between before and after said internal pressure being applied to the tire; and the tire from near the shoulder portion to the buttress portion outwardly swells when the internal pressure is applied to the tire.

2. A passenger car pneumatic tire according to claim 1, wherein $0.45 \leq h_2/h_1 = 0.55$ in which $h_1$ and $h_2$ are the height of the tire section and the height at the maximum tire width, respectively of an inflated tire.

3. A passenger car pneumatic tire according to claim 1, wherein $0.60 \leq T/S \leq 0.65$ in which T and S are a width of the tread and the maximum tire width, respectively of an inflated tire.

* * * * *